UNITED STATES PATENT OFFICE.

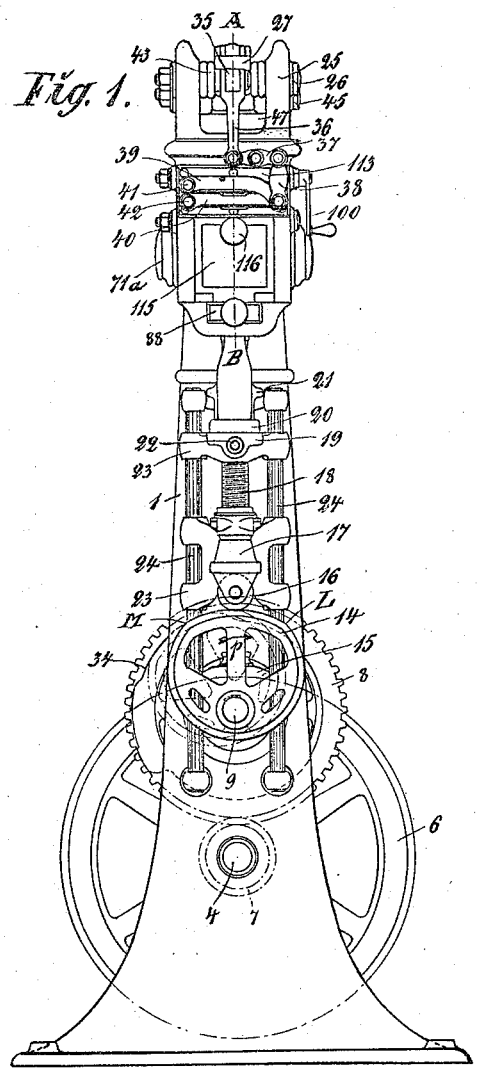

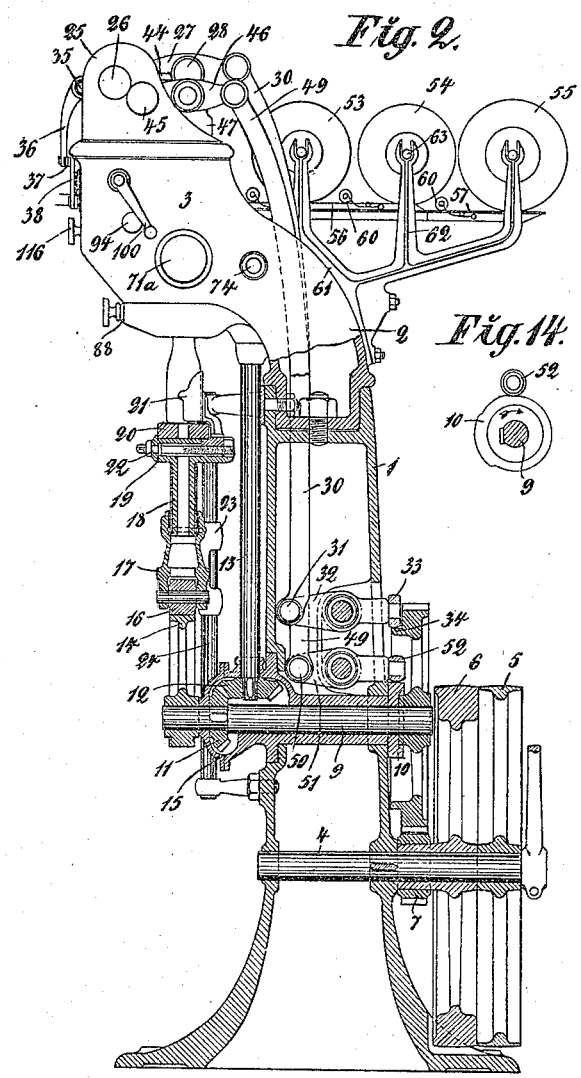

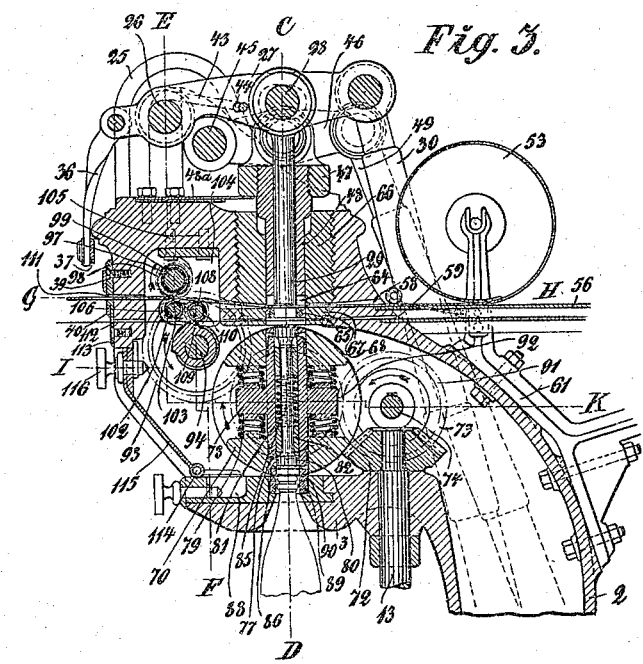

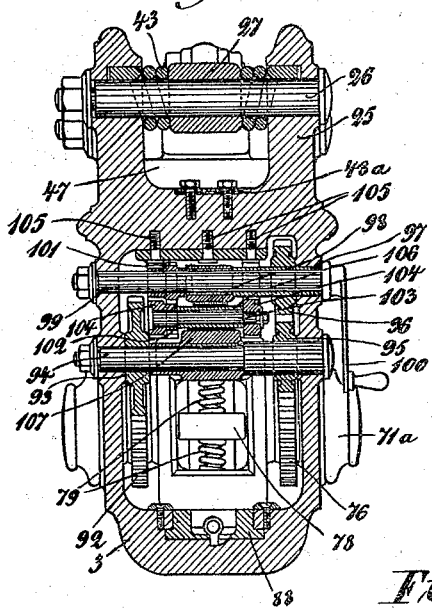

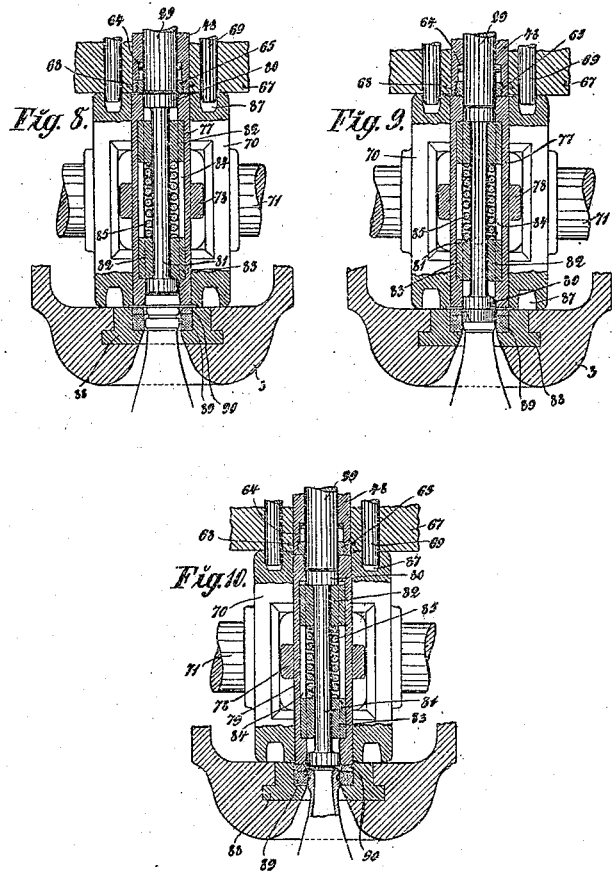

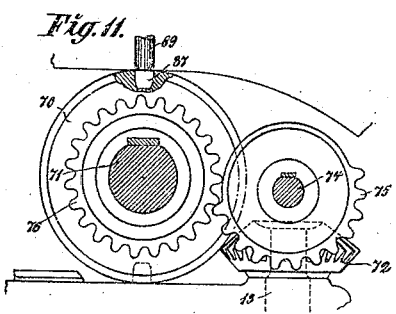
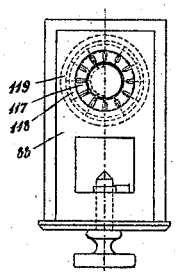
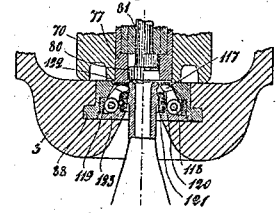

ANDERS ANDERSSON ROSENGREN, OF MALMÖ, SWEDEN.

MACHINE FOR CAPSULING OR SEALING BOTTLES OR OTHER VESSELS.

1,295,928.  Specification of Letters Patent.  Patented Mar. 4, 1919.

Application filed September 4, 1918. Serial No. 252,630.

*To all whom it may concern:*

Be it known that I, ANDERS ANDERSSON ROSENGREN, a subject of the King of Sweden, and resident of 70$^b$ Södra Förstadsgatan, Malmö, in the Kingdom of Sweden, have invented certain new and useful Improvements in Machines for Capsuling or Sealing Bottles or other Vessels, of which the following is a specification, reference being made to the accompanying drawings.

The present invention comprises improvements in bottle sealing machines having an intermittently rotating part, containing female dies wherein sealing capsules are formed, said machines being provided with a tool, which punches out of a strip, a disk or the like the blanks, from which the capsules are formed, the female dies being provided with movable heads which are connected with each other in such a manner that the head in one female die, containing a finished capsule, expels the same and applies it to a bottle when a capsule is formed in another female die.

The invention aims at improving machines of this kind so that the bottles may remain hermetically sealed for a long time if necessary even if a high pressure prevails in the same. In order to obtain this result, which involves essential advantages over the results secured by means of the machines mentioned above as well as by means of other machines for the same purpose, the tool, which punches the capsule blanks out of the capsule material, is combined with a device or a tool that serves as male die in forming the capsules, and punches out of a single or composite layer of material suitable for the purpose bodies or disks adapted to rest against the mouth of the bottles with a high pressure in order to hermetically close the bottles, said pressure being produced, during the sealing operation, by the last mentioned tool.

In addition to the said combination this invention comprises certain arrangements of parts in machines of the kind in question, adapted to render their operation efficient and reliable and their manipulation simple.

The annexed drawings exemplify a machine adapted for sealing bottles and constructed according to this invention.

Figure 1 is a front elevational view of the machine. Fig. 2 is a side elevational view with the lower part of the machine in vertical section. Fig. 3 is a vertical section of the upper portion of the machine, on the line A—B in Fig. 1, and Fig. 4 is a vertical section of the same part on the line C—D in Fig. 3. Fig. 5 is a vertical section on the broken line E—F in Fig. 3, Fig. 6 is a horizontal section on the broken line G—H in Fig. 3; and Fig. 7 is a horizontal section on the broken line I—K in Fig. 3. Figs. 8, 9 and 10 show a vertical section of a portion of the machine, the parts of this portion being in different positions. Fig. 11 shows diagrammatically an arrangement for transmitting motion to the intermittently rotating part containing the female dies. Figs. 12 and 13 show, in plan view and in vertical section respectively, an arrangement for sealing bottles with so-called Crown-corks, while Fig. 14 shows a cam, and a roller coöperating therewith.

The frame of the machine consists of a pillar 1 provided with a pedestal, the top of said pillar having a curved arm 2 attached thereto, the free end of said arm forming a head 3 containing the principal operative parts of the machine. In the pillar 1 there is rigidly mounted a horizontal shaft 4, on which are arranged two loose pulleys 5 and 6, the former of which serves as an idle disk for a belt when the machine is not working. On the extended hub of the pulley 6 a pinion 7 is fixed which engages with a toothed wheel 8 attached to one end of a horizontal shaft 9 journaled in the pillar 1. Inside the toothed wheel 8 a cam 10 is arranged on the shaft 9. On the other end the shaft 9 carries an eccentric 14, as well as a bevel gear wheel 11 meshing with another bevel gear wheel 12 mounted on a vertical shaft 13.

The shaft 13 has its lower end journaled in a casing 15 in which the toothed gearing 11, 12 is located, while its upper end is journaled in a bearing in the frame arm 2.

The periphery of the eccentric 14 is curved on two arcs, the shorter of which has its center on the center line of the shaft 9, while the center of the longer arc is located between said line and the first mentioned arc. The eccentric rotates in the direction indicated by the arrow $p$, (Fig. 1), so that the edge L is in advance of the edge M.

A roller 16 rests against the periphery of the eccentric 14, said roller being rotatably attached to the lower end of a sleeve 17, the upper end of which forms the nut of a screw spindle 18, the upper portion of the latter being formed as a plate carrying an elastic bed 20 for supporting the bottles during the sealing operation. The bed 20 is thus vertically adjustable according to different heights of bottles by turning the screw spindle 18 in the sleeve 17. Above the bed 20 there is a shield 21 against which the bottles to be sealed are placed, and which is adjustable to different bottle diameters by means of a screw 22 journaled in the plate 19. The sleeve 17 and plate 19 are connected with sleeves 23 surrounding bars 24 attached to the pillar. By means of this arrangement the bottles are steadily guided when moved up and down by the eccentric 14; when the shorter arc of the latter moves under the roller 16, the bottle placed on the bed 20 does not move, and the sealing of the same then takes place.

The upper part of the frame head 3 comprises two arms 25 in which a shaft 26 is fixed, an arm or lever 27 being pivotally mounted on said shaft 26, which arm or lever, at about its center, is connected by means of a pivot 28, passing through a slot in the lever, with a plunger 29 (Figs. 3 and 8-10) serving to punch disks out of the material therefor. At its rear end the lever 27 is connected to a link 30 (Figs. 2 and 3) which is bifurcated and spans the tables for supporting the capsule material and the disk material. The lower ends of the branches of the link 30, which branches extend downwardly in the frame arm 2 and the frame pillar 1, are traversed by a pivot 31 (Fig. 2), which is carried by one end of a lever 32, pivoted in the frame pillar, said lever 32 at the end outside the frame pillar carrying a roller 33 which rests against the outside of a cam 34 arranged on the inner side of the toothed wheel 8 (Figs. 1 and 2). The cam 34 effects the operative movements of the plunger or punch 29.

At its front end the lever 27 is provided with a nose 35 (Figs. 1, 2 and 3) from which a link 36 depends, connected with one arm of a double armed lever 37, pivoted at the front side of the frame head 3, a link 38 depending from the other arm of said lever 37. This link 38 is connected to two shear blades 39 and 40 fixed to the front side of the frame head 3 by means of pivots 41 and 42 respectively.

The shaft 26 is surrounded by a spiral spring 43 (Figs. 3 and 5), the ends of which are fixed in the arms 25 and the central straight part of which passes through an oblong slot 44 in the lever 27. Said spiral spring effects the return movement of the punch 29.

Below the shaft 26 a shaft 45 (Figs. 2 and 3) is fixed in the arms 25, said shaft 45 having pivoted thereon the ends of two arms or levers 46, at the center of which a head 47 is carried by means of pivots in slots in the levers, said head 47 serving as a holder for a tubular punch 48 (Figs. 3, 4 and 8-10), by means of which the capsule blanks are punched out of the capsule material and which punch surrounds the punch 29, which is movable up and down in the same.

The cutting edge of the tubular punch 48 is shaped so that when punching a capsule blank out of the blank material a tearing-off tongue or tab is also punched out; the shape of the punch holes, made by the punch 48 in the blank material, appearing in the lower of the two superimposed strips of material shown in Fig. 6.

The rear ends of the levers 46 are connected to links 49 (Fig. 2) which extend, outside the branches of the link 30, through the frame arm 2 and the upper part of the frame pillar 1 and are connected at their lower ends, by means of a pivot 50 with a lever 51, fulcrumed in the frame pillar, said lever 51 carrying at the end outside the frame pillar, a roller 52 which rests against the circumference of the cam 10 which effects the operative movements of the tubular punch 48. The return movement of this punch is effected by a spring 48$^a$ fixed to the top of the frame head 3, said spring acting with its free end against the bottom of the head 47 (Fig. 3).

By means of the machine illustrated in the drawings disks are punched out, which are composed of two comparatively thick layers. One layer—that one in direct contact with the bottle mouth—is formed by the punch 29 from a strip of cork, cork imitation or any other elastic substance, said strip being fed from a roll 53 (Figs. 2 and 3), while the other layer is made from a strip consisting of thick parchment, a soft metal or metal alloy or any other, comparatively firm substance and is fed from a roll 54. The capsule blanks are, as usual, punched out by means of the tubular punch 48 from a strip of aluminium or equivalent material fed from a roll 55. The strips from the rolls 53 and 54, that is to say, the strips from which the disks are made, are supported by a table 56 (Fig. 3), while the strip from the roll 55 and supplying the capsule blanks, is supported by a table 57 below the table 56. Said tables extend a short distance into the frame head 3 and passages 58 and 59 (Fig. 3) in the frame head form continuations of such tables, the cross sections of these passages being a little greater than the cross sections of the blank strips. The passages extend beyond the tubular punch 48. The blank strips are held against the tables 56 and 57 by rollers 60 (Fig. 2) acting upon their upper sides with a resilient pressure. On the frame arm 2 a plate 61 is fixed, having upwardly extending arms 62 at opposite sides of the tables 56 and 57 and in the upper forked ends of which arms the rolls rest by means of pintles 63.

Near the lower end of the tubular punch 48 a recess 64 (Figs. 3, 4 and 8–10) is formed, which communicates with the passage 58 in the frame head and through which the blank strip for the disks moves. This recess 64 is limited by a ring 65 screwed into the bottom of the tubular punch, the upper interior edge of said ring coöperating with the punch 29 during the punching of the disks out of the strip resting against the ring.

Secured into the frame head 3 is a sleeve 66 (Figs. 3 and 4) which surrounds and guides the tubular punch 48 sliding therein, the punch in its turn forming a guide for the punch 29 surrounded by it. Below the sleeve 66 a ring 67 (Figs. 3, 4 and 8–10) is located in the frame head, said ring 67 being provided with a recess 68, which communicates with the passage 59 in the frame head and through which the capsule blank strip moves. The lower part of the tubular punch 48 moves up and down in the ring 67, the inner side of which together with the bottom side of the recess 68 forms an edge coöperating with the exterior edge of the bottom of the tubular punch for punching out the capsule blanks.

In the head 47 bars 69 (Figs. 4 and 8–10) are pivoted, which pass through the sleeve 66 and the ring 67 and serve to guide the tubular punch 48. Moreover, said bars serve to lock the female die cylinder, as will be hereinafter described.

The female die cylinder 70 (Figs. 3, 4 and 7–10) is mounted in the head 3 by means of journals 71, bearing in sockets 71ª screwed into the frame head 3. At the top of the shaft 13 a bevel gear wheel 72 (Figs. 3 and 11) is arranged meshing with another bevel gear wheel 73 fixed on the shaft 74. The wheel 73, is integral with a spur gear wheel 75, having teeth only around one half of its periphery. The wheel 75 coöperates with a spur gear wheel 76, fixed on one of the journals 71 of the female die cylinder. By this arrangement the female die cylinder is caused—as will be readily understood—to rotate intermittently one half revolution at a time.

Slidably mounted in the female die cylinder is a tube 77 (Figs. 3, 4 and 7–10) provided with a central peripheral flange 78 between which and the body of the female die cylinder spiral springs 79 are arranged. The ends of the tube 77 form the walls of the female dies, in which the capsules are formed. The interior diameter of each tube end exceeds the diameter of the punch 29 by an amount a little greater than twice the thickness of a capsule blank, while the exterior diameter of the tube end exceeds the exterior diameter of the tubular punch 48 by an amount a little greater than the said (double) thickness. The bottoms of the female dies are formed by the heads 80 of a bar 81 centrally arranged in the tube 77. Adjacent each head 80 the bar 81 is surrounded by a sleeve 82, provided with projections or guides 83 for which there are provided slots 84 in the inner side of the tube 77. Between the sleeves 82 a spring 85 is arranged surrounding the bar 81.

The interior of the ends of the tube 77 are slightly conical, corresponding to the shape of the capsules.

At each end of the tube 77 there is a pair of springs 86, acting against a capsule formed in a female die and maintaining it therein when the male die or the punch 29 moves out of the female die.

Each of the heads 80 may be provided with male dies for impressing into the capsules an indication such as the nature or the origin of the liquid contained in the bottles, or a certain date (for instance, the date of capping), corresponding female dies being arranged in the end surface of the punch 29; the arrangement of these impressing dies may be the reverse, that is to say the male dies may be located on the punch and the female dies in the heads.

In the periphery of the female die cylinder openings 87 are arranged, in which the lower ends of the bars 69 engage in order to keep said cylinder in a locked position during the formation of a capsule in one female die and the expulsion of a finished capsule out of the other female die.

In the lower part of the frame head 3 a slide 88 (Figs. 1, 3, 4 and 8–10) is removably placed in which slide there is a ring 89 of rubber or any other suitable substance. On the rubber ring 89 a ring 90 of metal is placed. The rubber ring 89 serves—as already known—to press the wall of a capsule, placed on a bottle head, into a groove or grooves in the bottle head, for which purpose the ring 89 is compressed by the metal ring 90 which in its turn is acted upon by the tube 77 when actuated by the tubular punch 48.

The exterior diameter and the interior diameter of the rings 89 and 90 are slightly larger than the corresponding diameters of the tubular punch, and the interior of the ring 90 is slightly rounded or conical at the top in order to facilitate the entrance of a capsule into the ring, when it is pressed down on the bottle head surrounded by the two rings.

To the end of the shaft 74 opposite that carrying the mutilated gear wheel 75 a toothed wheel 91 (Figs. 3 and 7) is rigidly fixed, which meshes with another toothed wheel 92 (Figs. 3, 4, 5 and 7), which is loosely mounted on one of the journals 71 of the female die cylinder. The toothed wheel 92 meshes in its turn with a third toothed wheel 93 (Figs. 3 and 5) rigidly fixed to one end of a shaft 94. The three wheels 91, 92 and 93 are of the same diameter. At the other end of the shaft 94 a toothed wheel 95 (Figs. 5 and 6), having a smaller diameter, is attached, coöperating with a similar toothed wheel 96 (Fig. 5), arranged on a hollow shaft 97 on which shaft a roller 98 is arranged. In the tubular shaft 97 another shaft 99 is rotatably located, this shaft being provided with a crank 100 laterally of the frame head 3. On the shaft 99 there is fixed a toothed wheel 101 meshing with another toothed wheel 102 placed on a shaft 103 which, by means of eccentric journals, is supported by a hanger 104 fixed to the frame head 3 by means of bolts 105. On the shaft 103 a roller 106 (Fig. 5) is arranged, which coöperates with the roller 98 in order to feed forward the blank strip from which the disks are punched.

On the shaft 94 there is a roller 107 (Figs. 3 and 5) coöperating with another roller 108 (Fig. 3) for feeding forward the blank strip from which the capsules are punched. The roller 108 is mounted on a shaft 109 (Fig. 3) which, is supported by the hanger 104 and which shaft 109 is provided with a toothed wheel 110 engaging with the toothed wheel 102.

The rollers 98 and 107 are provided with cams by means of which they act upon the blank strips, the rollers 106 and 108 serving as counter-pressure rollers. The length of said cams, relatively to the circumference of the rollers, is equal to the amount the blank strips are to be fed forward after each punching operation.

By reason of the fact that the journals of the shafts 103 and 109 are eccentric, the rollers 106 and 108 on said shafts can be displaced laterally by turning the crank 100, so that they do not press against the rollers 98 and 107. By this means the blank strips may be easily and rapidly stopped without the necessity of interrupting the work of the machine.

The strip feeding device is situated in a chamber within the frame head 3, to one side of which chamber the passages 58 and 59 for the blank strips extend. At the other side of said chamber passages 111 and 112 (Fig. 3) are arranged in the frame head, through which passages the blank strips, from which the blanks for the capsules as well as for the disks have been punched out, leave the machine. The passages 111 and 112 are extended through a plate 113 (Figs. 1, 3 and 6) fixed to the front of the frame head. Close to the plate 113 the shear blades 39 and 40 move the plate forming edges, with which the shear blades coöperate to cut off, piece by piece, the portions of the strips from which blanks have been punched.

In order to permit the parts in the frame head to be easily examined during the operation of the machine, a flap 115, pivoted on a shaft 114 (Fig. 3) and provided with a locking device 116, is attached to the frame head 3.

The machine operates in the following manner:

In Figs. 1–3 the parts of the machine are shown in the positions they occupy immediately before punching blanks out of the blank strips; it should, however, be observed that the eccentric 14 at that time occupies the position indicated by dotted lines in Fig. 1, that is to say that the edge L is just below the roller 16, so that the bottle on the bed 20 is maintained sufficiently long in its highest positions in which it is supplied with a capsule and sealed. Upon the continued movement of the parts the punch 29 is forced downward by the action of the cam 34 raising the roller 33, and a composite disk is punched out of the strips fed from the rolls 53 and 54. The disk punched out is forced downward by the punch 29 toward the blank strip fed from the roll 55, from which strip the tubular punch 48, by reason of the raising of the cam 10 by the roller 52, punches a capsule blank. The tubular punch 48 stops for a moment, the punched out capsule blank being pressed between its lower edge and the upper edge of the tube 77 in the female die cylinder 70, the disk then resting centrally on the upper surface of the capsule blank (see Fig. 8). Then the roller 33 is forced farther upward by the cam 34, whereby the punch 29 is moved farther downward, so that its lower end passes into the top of the tube 77, forcing the capsule blank into the tube 77 thereby forming the capsule in the bottom of which the composite disk rests. When the upper head 80 moves downwardly during the formation of a capsule the lower head 80 also moves downward, under which latter head there is a finished capsule, and as a result of this movement said capsule is forced down on the bottle head in the rings 89 and 90, the free edge of the capsule then sliding along the inside of the ring 90. While the finished capsule is forced down upon the bottle head the tearing off tongue or tab is folded upward, said tongue being, before the capsule is forced down, located in a notch in the bottom of the tubular punch 48, so that it will rest against the capsule wall, as shown in Fig. 9.

Immediately after the action just described the cam 34 again forces the roller 33 somewhat upward, so that the punch 29 moves farther downward. This movement results in the disk in the capsule placed on the bottle head being—during compression of the springs 85—tightly pressed against the bottle mouth. This pressure, which is counter-acted by the counter-pressure of the elastic bed 20, on which the bottle is placed, is so great that the elastic layer in the disk is pressed to some extent downward into the bottle mouth (see Fig. 10). When the disk is pressed down into the bottle mouth, the roller 52 forces the eccentric 10 farther upward, whereby the tubular punch 48 and the tube 77 in the die cylinder 70 are driven downward, the latter—during compression of the lower pair of the springs 79, which act upon the flange 78 of the tube 77—pressing the metal ring 90 downward, so that the rubber ring 89 is compressed and its inner wall caused to bulge outwardly and force the capsule wall into the groove in the bottle head. The bottle is now hermetically closed even for liquids under high pressure, and the sealing is such as to permit that part of the capsule which is above the bottle mouth to assume a convex shape, when, during pasteurizing of the liquid in the bottle, the pressure in the latter is raised without impairing the tightness of the hermetic seal.

During the last two downward movements of the punch 29 those parts of the strips from which blanks have been punched and which project beyond the frame head 3, are cut off. When the punch 29 moves downward, the nose 35 will move upward, and the shear blades 39 and 40 will turn downward about their pivots 41 and 42. During the said movements of the punch 29 the edges of the shear blade pass the lower edges of the openings in the disk 113 which form continuations of the passages 111 and 112 in the frame head and thus the blades will cut the projecting portions of the strips.

During the operations described above the bottle has been held in its upper position by the arc L—M of the eccentric 14. The capsule having become free from the rubber ring 89 (on account of the return movement of the tubular punch 48) the bed of the bottle moves downward, so that the bottle can be removed and replaced by a fresh bottle.

Immediately after completing the sealing operation the punch 29 and the tubular punch 48 return to their original positions in consequence of the rollers 33 and 52 leaving the cams 34 and 10 respectively, so that the punches 29 and 48 may be returned by the springs 43 and 48ª. During the return movement of the tubular punch the ends of the bars 69 move out of the openings 87 in the female die cylinder, and at the same time the tube 77—leaving the ring 90 free—is by means of the compressed springs 79 returned into the female die cylinder which is, thus, free to turn. When the punch 29 upon its return movement moves out of the capsule, during the forming of which it has served as a male die, the capsule is—as mentioned above—retained in the female die by the springs 86.

When the female die cylinder becomes free, the toothed wheel 75, which has been constantly rotating, engages the toothed wheel 76, turning this wheel and thus the female die cylinder 70 have a revolution, so that the female die containing a finished capsule will be just above the chamber in the rings 89 and 90, while the parts located diametrically opposite in the female die cylinder will be just below the punch 29 and the tubular punch 40 for the formation of another capsule.

When the punch 29 and the tubular punch 48 are sufficiently elevated as to be out of the way of the blank strips (that is to say in the positions shown in Figs. 3 and 4), feeding of the blank strips again takes place by the action of the cams of the rollers 98 and 107, which are continuously rotating and are driven from the vertical shaft 13 by the aid of the toothed wheels 91, 92, 93, 95 and 96, the rollers 106 and 108, as already mentioned, then serving as counter-pressure rollers.

The parts of the machine are now positioned for punching out a fresh capsule blank and a fresh disk, for forming a capsule provided with means for stoppering the mouth of the bottle, for applying the capsule made immediately before to the head of the bottle placed on the bed 20 and pressing it about the bottle head, and the steps described are repeated during the continued working of the machine.

It will be noted that the several steps above described are effected during one complete uninterrupted operation of the machine, which fact is of great importance, because among other reasons the output of the machine will be considerable. Moreover, it is of equal importance that the tool which punches out the disks (which are not larger than the bottom of the capsules and because of this do not hinder the sealing or render the same difficult) applies the disk in a capsule placed on a bottle head, against the bottle mouth with a pressure which secures a reliable gas-tight sealing of the bottle even though high pressure prevail therein, as above indicated.

Machines embodying this invention may be arranged in other ways than that indicated by way of example. So, for instance, they may be arranged for sealing bottles (or other vessels) with so-called Crown-corks, in which the capsule material is so thick that it cannot be pressed into the grooves in the bottle heads by means of a rubber ring. An arrangement for this purpose (and in all the cases, where the capsule material has a high resistance is shown in Fig. 12 in plan view and in Fig. 13 in vertical section (to the right in both figures before applying the capsule on the bottle head and to the left after the sealing). Instead of the rubber ring 89 there is arranged in the slide 88 an annular series of fingers 117, the lower hub-shaped ends of which are rotatable on a common annular shaft 118. The hubs of the fingers 117 are surrounded by an elastic (rubber) ring 119, and inside the fingers there is a ring 120 having the shape of a buffer spring which effects the return movement of the fingers. Inside the ring or spring 120 there is an elastic (rubber) ring 121, serving as a guide for the bottle heads. On the top of the fingers a ring 122 rests (not shown in Fig. 12) upon which ring the tube 77 in the female die cylinder 70 acts. The ring 122, which corresponds to the ring 90 in the arrangement before described, prevents the fingers from wearing slots in the bottom of the tube 77. Into the lower part of the slide 88 is screwed a ring 123, which maintains the parts within the slide in position. The annular shaft 118 is split at a certain place to allow it to extend and contract, according as the bottle heads have diameters of different sizes or if they are not quite circular, through which fact breaking of the bottle heads during pressing of the capsules around them is avoided. The elastic ring 119 also extends and contracts with the annular shaft 118.

The device of Figs. 12 and 13 works in the following manner. When the tube 77 moves downward, it acts upon the ring 122, which in its turn acts upon the fingers 117 which during the compression of the spring 120 are pressed downward and inward. The capsule wall extending down past the fingers is pressed by them into the groove in the bottle head, by reason of which the sealing of the bottle is effected When the tube 77 returns, the fingers 117 are returned by the spring 120 so as to allow the bottle to be removed.

The devices herein described for driving the operative parts of the machine, for instance, the punch 29 or the tubular punch 48, may be otherwise constructed, and several other modifications of the machine may also be made without departing from the spirit of the invention. Machines constructed according to this invention may be employed for sealing other vessels than bottles, and the disks may be single instead of being composite or they may be composed of more than two layers.

Having now described my invention, what I claim as new and desire to secure by Letters Patent is:

1. In a machine of the character described, the combination with a pair of telescoping cutting punches, of means for feeding material from which blanks may be cut in different planes across the cutting edges of said punches, means for moving the outer punch against the material adjacent thereto to cut a blank therefrom, means carried by said outer punch with which the inner punch coöperates in punching out blanks, and means for moving the inner punch to a greater extent than the outer punch whereby said inner punch cuts a blank from the material adjacent thereto and moves said blank against the first mentioned blank.

2. In a machine of the character described, the combination with a tubular punch having an opening near its cutting edge, of a second punch reciprocable within the tubular punch, means for feeding a strip of material through said opening across the cutting edge of the second punch, means for feeding a strip of material across the cutting edge of the tubular punch, and means for actuating said punches to cut blanks from said strips of material.

3. In a machine of the character described, the combination with a tubular punch having an opening through its wall near its cutting edge, of a second punch reciprocable within the tubular punch, a hollow member inserted in the tubular punch below the opening therein, means for feeding a strip of material through said opening across the cutting edge of the second punch, means for feeding a strip of material across the cutting eedge of the tubular punch, means for actuating the tubular punch for cutting blanks from the material adjacent thereto, and means for actuating the second punch to coöperate with said hollow member for cutting blanks from material adjacent to the second punch.

4. In a machine of the character described, the combination with a plurality of coaxial cutting punches, of means for feeding material from which blanks may be cut in different planes across the cutting edges of said punches, a member having female die portions therein successively movable into alinement with said punches, and means for so actuating said punches that one thereof forces blanks cut from said material by both of said punches into said female dies.

5. In a machine of the character described, the combination with means for feeding capsule material, of a punch for punching capsule blanks out of such material, means for feeding disk material, a punch for punching disks out of said last mentioned material, a female die member coöperatively related to said punches, means for depressing the first mentioned punch, and means for depressing the second mentioned punch in a step-by-step movement to punch out disks from the disk material, force such disks against the capsules and form the latter into capsule shape in said female die member.

6. In a machine of the character described, the combination with a pair of telescoping punches, of means for feeding material from which blanks may be cut across the cutting edges of said punches, a member having female die portions therein successively movable into alinement with said punches, a capping die adjacent said member, a tube reciprocable in said member, and means for actuating said punches whereby one thereof forms a capsule in said tube and the other punch moves said tube axially toward said capping die to apply a capsule to a bottle.

7. In a machine of the character described, the combination with a pair of telescoping punches, of means for feeding material from which blanks may be cut across the cutting edges of said punches, a bottle support in substantial axial alinement with said punches, a female die member movably interposed between the punches and the bottle support, a tube reciprocable in said die member, a capping die adjacent said female die member and means for actuating said punches whereby one thereof forms a capsule in one end of said tube and the other punch moves said tube axially toward said capping die to apply a capsule in the other end of the tube to a bottle on said support.

8. In a machine of the character described, the combination with a pair of telescoping punches, of means for feeding material from which blanks may be cut across the cutting edges of said punches, a bottle support in substantial axial alinement with said punches, a female die member movably interposed between the punches and the bottle support, a capping die adjacent said female die member, a tube reciprocable in said die member, means for imparting three successive axial movements to the inner punch whereby the same cuts a disk, moves it against and into a capsule and forms the latter at one end of said tube, and means for imparting two successive axial movements to the outer punch whereby the same cuts a capsule blank at one end of said tube as the result of the first movement and as the result of the second movement moves said tube axially toward said capping die to apply a complete capsule in the other end of the tube to a bottle on said support.

9. In a machine of the character described, the combination with telescoping punches, of means for feeding material from which blanks may be cut across the cutting edges of said punches, a female die member movably arranged adjacent said punches, a tube reciprocable in said female die member and having a radially extending flange, resilient means interposed between said flange and the body of said female die member for normally maintaining the flange in a substantially central position in the female die member, and means for actuating said punches.

10. In a machine of the character described, the combination with telescoping punches, of means for feeding material from which blanks may be cut across the cutting edges of said punches, a rotatably mounted female die cylinder arranged adjacent the punches, a tube slidable in said die cylinder, means for actuating said punches to form capsules in the ends of said tube, and springs at the ends of said tubes for temporarily retaining capsules therein.

11. In a machine of the character described, the combination with telescoping punches, of means for feeding material from which blanks may be cut across the cutting edges of said punches, a bottle support in substantial axial alinement with said punches, a female die cylinder rotatably mounted between the bottle support and the punches and having peripheral openings therein, means for actuating said punches, and rods depending from said punches and adapted to enter the peripheral openings in the female die cylinder and temporarily lock the same.

In witness whereof I have hereunto set my hand in presence of two witnesses.

ANDERS ANDERSSON ROSENGREN.

Witnesses:
O. LARSSON,
M. J. AHLGREN.

Copies of this patent may be obtained for five cents each, by addressing the "Commissioner of Patents, Washington, D. C."